(12) United States Patent
Miura et al.

(10) Patent No.: US 10,486,110 B2
(45) Date of Patent: Nov. 26, 2019

(54) SILICA MEMBRANE AND SEPARATION MEMBRANE FILTER

(71) Applicant: NGK INSULATORS, LTD., Nagoya (JP)

(72) Inventors: Aya Miura, Nagoya (JP); Masahiro Furukawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/703,066

(22) Filed: Sep. 13, 2017

(65) Prior Publication Data

US 2018/0015427 A1 Jan. 18, 2018

Related U.S. Application Data

(63) Continuation of application No. PCT/JP2016/058109, filed on Mar. 15, 2016.

(30) Foreign Application Priority Data

Mar. 19, 2015 (JP) .................... 2015-055919

(51) Int. Cl.
  *B01D 61/14* (2006.01)
  *B01D 69/02* (2006.01)
  (Continued)

(52) U.S. Cl.
  CPC ......... *B01D 71/021* (2013.01); *B01D 61/145* (2013.01); *B01D 61/362* (2013.01);
  (Continued)

(58) Field of Classification Search
  CPC ........ B01D 69/10; B01D 69/12; B01D 69/02; B01D 69/141; B01D 63/066; B01D 71/02;
  (Continued)

(56) References Cited

U.S. PATENT DOCUMENTS

| 5,110,470 A | 5/1992 | Yokosawa et al. |
| 2008/0093291 A1 | 4/2008 | Isomura et al. |

(Continued)

FOREIGN PATENT DOCUMENTS

| JP | 01-304006 A1 | 12/1989 |
| JP | 03-143535 A1 | 6/1991 |

(Continued)

OTHER PUBLICATIONS

English language machine translation of JP2013128886, 31 Pages, No Date.*

(Continued)

*Primary Examiner* — Pranav N Patel
(74) *Attorney, Agent, or Firm* — Burr & Brown, PLLC

(57) ABSTRACT

A silica membrane filter 10 includes a porous substrate 13 and a silica membrane 18 formed on the porous substrate 13, the silica membrane 18 having an aryl group. The silica membrane 18 has an atomic ratio Si/C, as determined by elemental analysis using energy-dispersive X-ray spectrometry (EDX), in the range of 0.2 to 15. The silica membrane 18 preferably has a thickness in the range of 30 nm to 300 nm and an X/Y, a ratio of an absorption intensity X of a Si—O—Si bond to an absorption intensity Y based on the aryl group in a Fourier transform infrared absorption spectrum (FT-IR), in the range of 5.0 to 200.

9 Claims, 4 Drawing Sheets

(51) Int. Cl.
*B01D 71/02* (2006.01)
*B01D 71/06* (2006.01)
*B01D 61/36* (2006.01)
*B01D 63/06* (2006.01)

(52) U.S. Cl.
CPC .......... *B01D 63/066* (2013.01); *B01D 69/02* (2013.01); *B01D 71/027* (2013.01); *B01D 71/06* (2013.01); *B01D 2325/02* (2013.01); *B01D 2325/04* (2013.01); *B01D 2325/20* (2013.01); *B01D 2325/30* (2013.01)

(58) Field of Classification Search
CPC .. B01D 71/028; B01D 71/021; B01D 71/024; B01D 2325/02; B01D 2325/04; B01D 2325/20; B01D 67/0048; B01D 2253/10; B01D 2253/102; B01D 2253/104; B01D 2253/106; B01D 2323/12; B01D 2323/40; B01D 46/2418; B01D 46/2429
See application file for complete search history.

(56) References Cited

U.S. PATENT DOCUMENTS

| 2010/0300960 A1 | 12/2010 | Hishiki et al. |
| 2014/0331860 A1 | 11/2014 | Isomura et al. |
| 2015/0053605 A1 | 2/2015 | Kawai et al. |

FOREIGN PATENT DOCUMENTS

| JP | 2001-212401 A1 | 8/2001 |
| JP | 2009-255035 A1 | 11/2009 |
| JP | 2010-506698 A1 | 3/2010 |
| JP | 2013-128886 A1 | 7/2013 |
| JP | 2013-226541 A1 | 11/2013 |
| WO | 2013/129625 A1 | 9/2013 |
| WO | 2013/146622 A1 | 10/2013 |

OTHER PUBLICATIONS

International Search Report and Written Opinion (Application No. PCT/JP2016/058109) dated Jun. 7, 2016.

Toshinori Tsuru, et al., "Permporometry Characterization of Microporous Ceramic Membranes," *Journal of Membrane Science*, 186 (2001), pp. 257-265.

English translation of International Preliminary Report on Patentability (Chapter I) (Application No. PCT/JP2016/058109) dated Sep. 28, 2017, 11 pages.

* cited by examiner

| PLACE | C | O | Al | Si | Ca | Ti | Si/C |
|---|---|---|---|---|---|---|---|
| | at% | | | | | | — |
| 1 | 26.30 | 40.12 | 0.26 | 32.59 | 0.00 | 0.73 | 1.23 |
| 2 | 0.00 | 58.00 | 0.41 | 8.96 | 0.68 | 31.95 | — |
| 3 | 1.00 | 56.71 | 0.18 | 8.72 | 0.65 | 32.74 | 8.72 |
| 4 | 0.00 | 57.34 | 0.37 | 7.34 | 0.83 | 34.13 | — |

SILICA MEMBRANE AND SEPARATION MEMBRANE FILTER

BACKGROUND OF THE INVENTION

1. Field of the Invention

The present invention relates to silica membranes and separation membrane filters. More particularly, the invention relates to a silica membrane and a separation membrane filter that selectively separate alcohol from an organic fluid mixture.

2. Description of the Related Art

Conventionally, there is proposed a silica membrane that provides a silica membrane filter, for example, through a process of applying a precursor sol of a silicon alkoxide containing a p-tolyl group to a porous substrate and performing drying and firing (see, for example, PTL 1). In this filter, the total mass of the silica membrane is 38 to 85 mass % of the total mass of a dried membrane, and the filter can selectively separate alcohol from a mixture of hydrocarbon and alcohol.

CITATION LIST

Patent Literature

PTL 1: WO 2013/146622 A1

SUMMARY OF THE INVENTION

However, the silica membrane filter disclosed in PTL 1 is not sufficient, although a silica membrane can be produced by a more suitable method and the silica membrane itself can be more suitable, and there has been a need for further improvements, for example, in alcohol permeation rate and alcohol separation selectivity.

The present invention has been developed in view of these problems, and it is a primary object of the present invention to provide a silica membrane and a separation membrane filter that can achieve a higher permeation rate and higher selectivity in separating alcohol from an organic fluid mixture.

To achieve the above primary object, the inventors conducted intensive studies to discover that, when an atomic ratio Si/C (the state of residual, aryl group) as determined by elemental analysis is controlled to be within a more preferred range by selecting, for example properties of an underlayer on which a silica membrane is formed, conditions of the formation of the silica membrane, and firing conditions, a target can be separated at a higher permeation rate with higher selectivity, thereby completing the present invention.

Thus, a silica membrane of the present invention has an aryl group and an atomic ratio Si/C, as determined by elemental analysis using energy-dispersive X-ray spectrometry (EDX), of 0.2 to 15.

A separation membrane filter of the present invention includes
  a porous substrate, and
  the above-described silica membrane formed on the porous substrate.

The silica membrane and the separation membrane filter of the present invention can achieve a higher permeation rate and higher selectivity in separating alcohol from an organic fluid mixture. This is presumably due to the following reason, for example. For example, the silica membrane containing an aryl group such as a p-tolyl group will have, due to the presence of the aryl group in a silica network, larger pores than conventional silica membranes when the aryl group is burned off; whereas when the aryl group remains in the silica membrane, the aryl group can interact, during liquid separation, with permeable components to promote permeation. Here, when the silica membrane has an atomic ratio Si/C in the range of 0.2 to 15, pores suitably permeable to alcohol are sufficiently present, and carbon (C) derived from the aryl group suitably remains, and as a result, a suitable alcohol permeation rate and suitable alcohol selectivity can be provided.

DETAILED DESCRIPTION OF THE INVENTION

Figure 1:
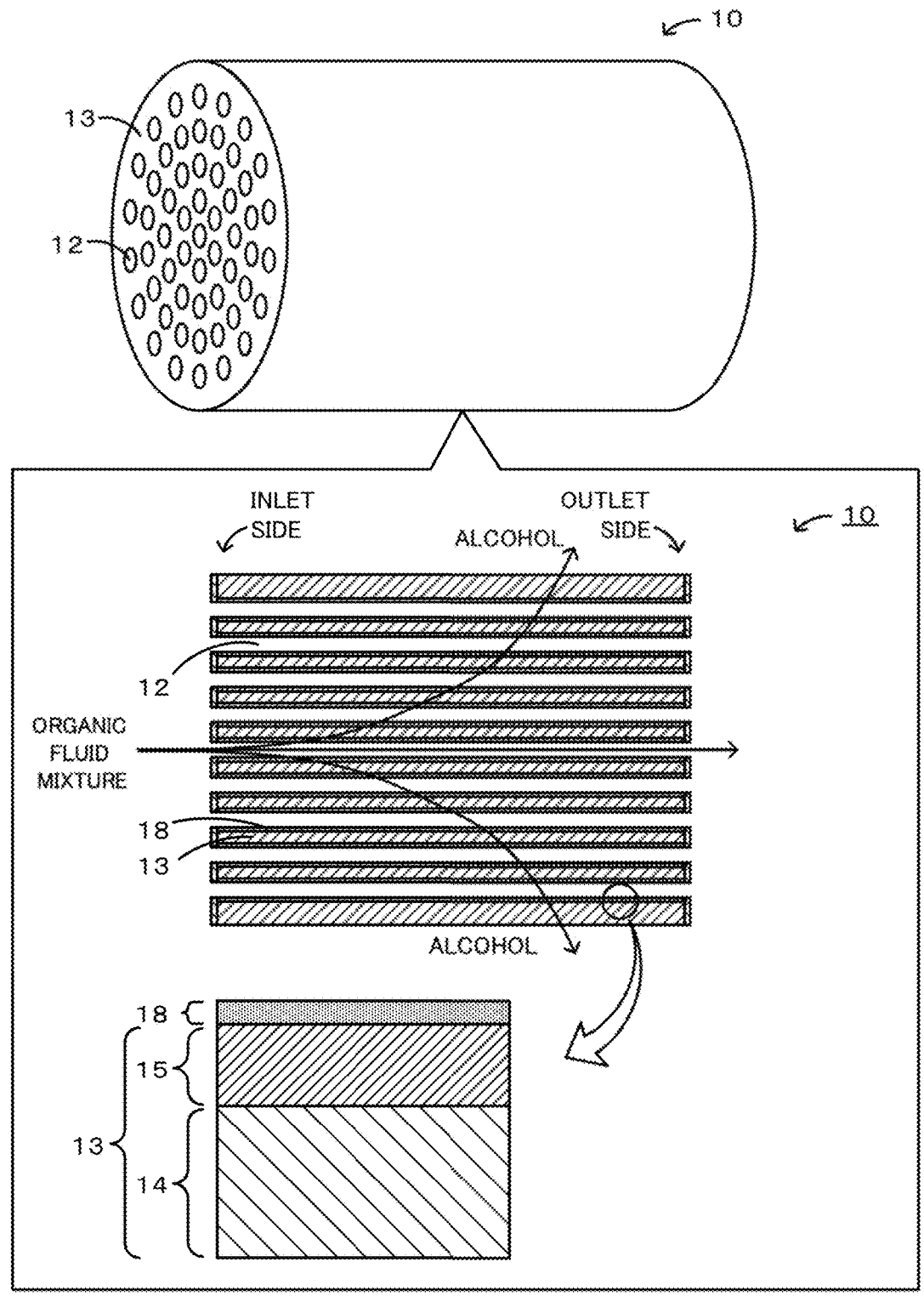
FIG. 1 is a schematic view illustrating a configuration of a silica membrane filter 10.

Embodiments of the present invention will now be described with reference to drawings. FIG. 1 is a schematic view illustrating a configuration of the silica membrane filter 10, which is a separation membrane filter according to one embodiment of the present invention. The silica membrane filter 10 includes a porous substrate 13 and a silica membrane 18 formed on the porous substrate 13. It can also be said that the silica membrane 18 of the present invention is formed on an ultrafiltration membrane 15 serving as an underlayer. The silica membrane 18 has an aryl group and an atomic ratio Si/C, as determined by elemental analysis using energy-dispersive X-ray spectrometry (EDX), in the range of 0.2 to 15.

The organic fluid mixture to be separated may be a fluid, mixture of hydrocarbon and alcohol, for example. Examples of the hydrocarbon include xylenes and n-octane, and gasoline fractions may be used. Examples of the alcohol include methanol, ethanol, propanol, and butanol, among which ethanol may be used. The fluid may be gaseous or liquid.

In the porous substrate 13, a plurality of cells 12 through which a fluid to be separated passes are formed. In the silica membrane filter 10, a target fluid enters the cells 12 from an inlet side. Among the components of the fluid, alcohols having molecular sizes small enough to pass through the silica membrane 18 pass through, the silica membrane 18 and the porous substrate 13, and are discharged through the side surface of the silica membrane filter 10. Impassable fluids (mainly, hydrocarbons) that cannot pass through the silica membrane 18 flow through the cells 12 and are discharged from, an outlet side of the cells 12. The porous substrate 13 may have a monolithic structure including the plurality of cells 12 or a tubular structure including a single cell. The porous substrate 13 may have any external shape such as a cylinder, an elliptic cylinder, a quadrangular prism, or a hexagonal prism. Alternatively, the porous substrate 13 may have a tubular shape with a polygonal section.

For example, the porous substrate 13 may include a support 14 and the ultrafiltration membrane 15 formed on a surface of the support 14, as illustrated in FIG. 1. The support 14 may have a pore size of about 0.1 µm to several hundred micrometers. The support 14 may have a porosity in the range of 20 vol % to 70 vol %. The material for the support 14 may be one or more ceramics such as alumina (e.g., α-alumina, γ-alumina, and anodized alumina), titania, silica, cordierite, zirconia, mullite, and zirconia. These materials can provide the porous substrate 13 with excellent properties such as high heat resistance, high chemical resistance, and high shock resistance. Among these materials, alumina is preferred in terms of ease of substrate formation and availability. The support 14 is preferably prepared, by forming and sintering alumina particles having an average particle size of 0.001 to 30 µm. The porous substrate 13 may have a monolayer structure or a multilayer structure. The support 14 may include, for example, a finely granular part on the surface of which the ultrafiltration membrane 15 is formed and a coarsely granular part on the surface of which the finely granular part is formed. The support 14 may be a member having a larger pore size or a higher porosity than the ultrafiltration membrane 15. The support 14 may be a member obtained by, for example, extrusion molding, and on the surface of the support 14, a microfiltration membrane made of, for example, alumina or titania may be formed.

The ultrafiltration membrane 15 (also referred to as the UF membrane) is a membrane that serves as an underlayer of the silica membrane 18. The ultrafiltration membrane 15 preferably has a thickness of 0.2 or more, more preferably 0.3 µm or more, still more preferably 0.5 µm or more. The ultrafiltration membrane 15 preferably has a thickness of 5 µm or less, more preferably 3 µm or less, still more preferably 2 µm or less. When the thickness is 0.2 µm or more, the ultrafiltration membrane 15 can more reliably cover the support 14. When the thickness is 5 µm or less, membrane cracking and other defects can be inhibited, and the silica membrane 13 can be more finely formed. The thickness of the ultrafiltration membrane 15 is determined by electron microscopy (SEM, STEM, or TEM). A cross section of the silica membrane filter 10 is observed under an electron microscope, in the image observed, 10 points are randomly selected and the thickness of the ultrafiltration membrane 15 is measured. In this measurement, the vertical distance from the top to the bottom of the ultrafiltration membrane 15 is measured, and the average is used as the thickness of the ultrafiltration membrane 15.

The ultrafiltration membrane 15 preferably has an average pore size in the range of 2 nm to 25 nm. When the average pore size is 2 nm or more, a silica raw material (e.g., a silica sol) can penetrate into pores of the ultrafiltration membrane 15 during silica membrane formation, which advantageously makes the silica membrane 18 less likely to peel off the ultrafiltration membrane 15, leading to improved strength. When the average pore size is 25 nm or less, the pore size is not too large relative to the particle size of the silica raw material, which prevents the silica sol from excessively penetrating into the ultrafiltration Membrane 15 if the thickness of the ultrafiltration membrane 15 is thin, and as a result, the silica membrane is readily formed on the surface of the ultrafiltration membrane 15. The average pore size of the ultrafiltration membrane 15 is more preferably in the range of 20 nm or less. The average pore size of the ultrafiltration membrane 15 is measured in accordance with a method described in NPL 1 (Journal of Membrane Science 186 (2001) 257-265). In the present invention, n-hexane is used as a condensable gas and nitrogen as a non-condensable gas.

The ultrafiltration membrane 15 contains an element M. Examples of the element M include Ti, Al, Si, and Zr. Specific examples include one or more ceramics such as alumina (e.g., α-alumina, γ-alumina, and anodized alumina), titania, silica, cordierite, zirconia, mullite, and zirconia. These materials can provide the ultrafiltration membrane 15 with excellent properties such as high heat resistance, high chemical resistance, and high shock resistance. Among these materials, titania is preferred in terms of ease of formation and availability.

Figure 2:
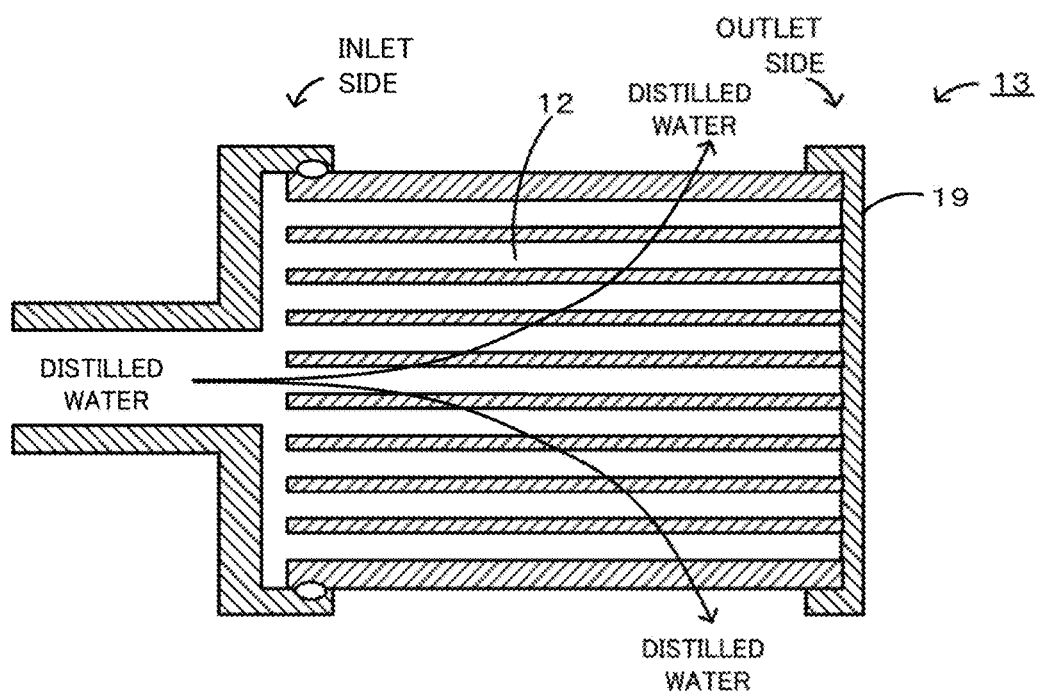
FIG. 2 illustrates a method for measuring water permeability.

The ultrafiltration membrane 15 preferably has a water permeability, as measured before the formation of the silica membrane 18, in the range of 0.5 m/day to 6.0 m/day. As the water permeability decreases, the resistance of the ultrafiltration membrane 15 increases, and the penetration of a silica raw material during the formation of the silica membrane 18 is reduced, which enables the silica membrane to be uniformly and thinly formed on the surface of the ultrafiltration membrane 15. A water permeability of 0.5 m/day or more can advantageously suppress the increase in the resistance of the ultrafiltration membrane 15 itself and suppress the decrease in alcohol permeation rate during separation. A water permeability of 6.0 m/day or less can suppress the increase in the penetration of the silica raw material, which enables the silica membrane 18 to be thinly and uniformly formed. The water permeability is more preferably 5.0 m/day or less, still more preferably 4.0 m/day or less. A method for measuring the water permeability will be described. FIG. 2 illustrates the method for measuring the water permeability. In the measurement of the water permeability, a seal portion 19 is first disposed on the outlet side of the porous substrate 13 (a filter before the formation of the silica membrane 18) including the ultrafiltration membrane 15 to seal one end of the cells 12, as illustrated in FIG. 2. Distilled water is then fed from the inlet side into the cells 12, and the flow rate, pressure, and temperature of the feedwater are measured. The measurements are converted to values under the conditions of 0.1 MPa pressure and 25° C., and the amount of water ($m^3$) that has flowed (passed through the membrane) per unit membrane area is defined as water permeability ($m^3/m^2/day$=m/day).

The ultrafiltration membrane 15 may be prepared using a raw material sol containing the element M. The ultrafiltration membrane 15 may be obtained, for example, through an ultrafiltration membrane preparation process including a formation treatment for forming the raw material sol on the surface of the support 14 to obtain a formed body, a drying treatment for drying the formed body, and a firing treatment for firing the dried body. The formation treatment, the drying treatment, and the firing treatment may be repeated, twice or more. The raw material sol may be any material containing the element M, and examples include a titania sol. Additives such as binders and thickeners may be added to the raw material sol. Examples of the additives include polyvinyl alcohols (PVA). The formation treatment may be performed by pouring the raw material sol into the cells 12 of the support 14. The drying treatment is only required to remove solvent in the raw material sol and can be performed, for example, in an atmosphere at a temperature from room temperature to 120° C. The firing treatment can be performed at a temperature at which the raw material sol is fixedly secured on the support 14 in the form of an oxide, for example, 400° C. to 800° C. more preferably 400° C. to 500° C. In the ultrafiltration membrane preparation process, to satisfy the above conditions such as thickness, the amount of membrane deposition (thickness) may be adjusted by appropriately selecting the concentration of the raw material sol, the number of membrane-forming cycles, and other conditions, and the pore size may be adjusted by appropriately selecting the firing temperature and the amount of additive.

The silica membrane 18 is a membrane that is formed on the porous substrate 13 (e.g., the ultrafiltration membrane 15) and that is selectively permeable to alcohol in an organic fluid mixture. The phrase "selectively permeable to alcohol" refers not only to isolating an alcohol with a purity of 100% from an organic fluid mixture but also to isolating a solution or a gas having a high alcohol content compared with the composition of the organic fluid mixture. For example, isolating an alcohol with a purity of 60% or higher or an alcohol with a purity of 75% or higher is also encompassed.

The silica membrane 18 has an atomic ratio Si/C, as determined by elemental analysis using energy-dispersive X-ray spectrometry (EDX), in the range of 0.2 to 15. The aryl group in the silica membrane 18 may be contained in a silica raw material, and some are burned off the membrane during firing to form some pores in the silica membrane, whereas some remain in the membrane to interact with alcohol to promote permeation. A Si/C of 0.3 or more leads to sufficient formation of pores in the silica membrane, which advantageously results in a higher ethanol permeation rate. A Si/C of 15 or less advantageously prevents an excessive decrease in the residual aryl group in the membrane to ensure an interaction with alcohol. The Si/C is more preferably 0.5 or more, still more preferably 0.7 or more. The Si/C is more preferably 8.0 or less.

The elemental analysis of the silica membrane 18 using EDX will be described below. First, the silica membrane filter 10 is cut cross-sectionally at a randomly-selected position so that a cross section of the silica membrane 18 can be observed. The cross section is then observed under an electron microscope (SEM or STEM). The electron microscope observation is performed at a magnification at which the silica membrane can sufficiently be observed such that the thickness of the silica membrane can be visually observed. In the image observed, 10 points are randomly selected and EDX elemental analysis is performed to determine the atomic ratio (Si/C). The average of the Si/C is used as a Si/C. Although the EDX elemental analysis is performed at randomly selected 10 points, the electron microscope observation is performed in at least one field, more preferably in two or more fields. For example, EDX elemental analysis at two points may be performed in five fields. The randomly selected 10 points are in fields not overlapping each other. To avoid local measurement, the range of a field of EDX analysis in one measurement is set to be at least about 0.2 μm or more in the direction orthogonal to the thickness direction and about X μm or more in the thickness direction. X μm is defined as a silica membrane thickness (μm) in the field×about 0.5 or more. The range of a field of EDX analysis is selected so as not to include an ultrafiltration membrane but to include a silica membrane portion alone. A sample for observation may be prepared by any method, but when a carbon-containing material (e.g., a resin) is used to protect or fix the sample, the material is used so as not to affect the analysis.

The silica-membrane 18 has an aryl group. Examples of the aryl group include, phenyl, benzyl, tolyl, and xylyl groups. In terms of alcohol permeability, tolyl and phenyl groups are preferred, and a p-tolyl group is particularly preferred. The silica membrane 18 may be made of a material in which the aryl group is directly bonded to Si.

The silica membrane 18 may have a thickness, for example, in the range of 30 nm to 300 nm. A thickness of 30 nm or more can provide the membrane with higher strength, and a thickness of 300 nm or less allows a target alcohol to be separated at a sufficient permeation rate. The thickness of the silica membrane 18 is preferably 50 nm or more and 100 nm or less. The thickness of the silica membrane 18 is determined by electron microscopy (SSM, STEM, or TEM). A cross section of the silica, membrane filter 10 is observed under an electron microscope. In the image observed, 10 points are randomly selected and the thickness of the silica membrane 18 is measured. In this measurement, the vertical distance, from the top to the bottom of the silica membrane 18 is measured, and the average is used as the thickness of the silica membrane 18.

The amount of the silica membrane 18 deposited on the porous substrate 13 (e.g., the ultrafiltration membrane 15) is preferably in the range of 0.3 $g/m^2$ to 5.2 $g/m^2$ per unit membrane area. When the amount of membrane deposition is 0.3 $g/m^2$ or more, the silica membrane can sufficiently cover the surface of the porous substrate 13 so that sufficient separation performance can be delivered. When the amount of membrane deposition is 5.2 $g/m^2$ or less, the silica membrane 18 advantageously cannot be excessively thick. When the silica membrane 18 is excessively thick, the silica membrane 18 cannot be in sufficient contact with a firing atmosphere during firing, and thus firing needs to be performed at a higher temperature in order to burn off the aryl group to an optimal amount, which may, for example, increase the risk of causing cracks during firing. The amount of the silica membrane 18 deposited on the porous substrate 13 is more preferably in the range of 5.0 $g/m^2$ or less, still more preferably in the range of 3.0 $g/m^2$ or less, per unit membrane area. The amount of deposition ($g/m^2$) of the silica membrane 18 can be determined by subtracting the mass of a filter before the silica membrane 18 is formed from the mass of the filter after the silica membrane 18 has been formed to calculate a total membrane mass, and dividing the total membrane mass by the total area of the silica membrane 18.

The silica membrane 18 preferably has an X/Y, a ratio of an absorption intensity X of a Si—O—Si bond to an absorption intensity Y based on the aryl group in a Fourier transform infrared absorption spectrum (FT-IR), in the range of 5.0 to 200. An X/Y of 5.0 or more leads to sufficient formation of pores in the silica membrane, which advantageously results in a higher ethanol permeation rate. An X/Y of 200 or less advantageously prevents an excessive decrease in the residual aryl group in the membrane to ensure an interaction with alcohol. The X/Y is more preferably 12.0 or more, still more preferably 160 or less. A characteristic absorption may be employed as the absorption based on the aryl group. For example, an absorption attributed to Si-Ph (Ph represents a benzene ring) or Si-Ph-$CH_3$ may be used. The absorption intensity X may be, for example, a peak intensity at or near 1050 $cm^{-1}$ attributed to a Si—O—Si bond. The absorption intensity Y may be a peak intensity at or near 3073 $cm^{-1}$ attributed to a Si-Ph-$CH_3$ bond. The FT-IR measurement is performed on powder of the silica membrane 18 taken out of the silica membrane filter 10. The X/Y is an average of X/Y values of different membrane powders.

In the silica membrane 18, pores having a size of 0.5 nm or more and 20 nm or less may be formed. Such a pore size can facilitate alcohol permeation. The pore size of the silica membrane 18 can be measured by a method based on the Kelvin equation, for example, using a pore size distribution analyzer (DYNAMIC PORE SIZE MEASUREMENT) available from SRI International. In the measurement, nitrogen gas can be used as a feed gas and n-hexane as a condensable gas.

The silica membrane 18 may be prepared using a raw material sol containing Si. A non-limiting example of the raw material sol containing Si is a precursor sol of a silicon alkoxide having an aryl group. In this raw material sol, the aryl group is particularly preferably directly bonded to Si. The silica membrane 18 may be obtained, for example, through a membrane preparation process including a membrane formation treatment; for forming a raw material sol on the surface of the porous substrate 13 to obtain a membrane body, a drying treatment for drying the membrane body, and a firing treatment for firing the dried body. The membrane formation treatment, the drying treatment, and the firing treatment may be repeated twice or more. The membrane formation treatment may be performed by pouring the raw material sol into the cells 12 of the porous substrate 13. The concentration of the raw material sol is not limited to a particular value as long as the raw material sol can be deposited in an appropriate amount on the surface of the porous substrate 13 and may be, for example, 0.2 to 5 mass %. The drying treatment is only required to remove solvent in the raw material sol and can be performed, for example, in an atmosphere at a temperature from room temperature to 120° C. The firing treatment can be performed at a temperature at which the raw material sol is fixedly secured on the porous substrate 13 in the form of an oxide. The firing treatment is preferably performed under conditions where some of the aryl groups in the raw material are burned off and some remain. The firing treatment can be performed, for example, at 350° C. to 500° C.

The silica membrane filter 10 according to this embodiment described above can achieve a higher permeation rate and higher selectivity in separating alcohol from an organic fluid mixture. This is presumably due to the following reason. For example, the silica membrane 18 containing an aryl group (e.g., a p-tolyl group) can have, due to the presence of the aryl group in a silica network, larger pores than conventional silica membranes when the aryl group is burned off; whereas when the aryl group remains in the silica membrane, the aryl group can interact, during liquid separation, with permeable components to promote permeation. Presumably, when the silica membrane 18 has an atomic ratio Si/C in the range of 0.2 to 15, pores suitably permeable to alcohol are sufficiently present and the aryl group (carbon: C) suitably remains, and as a result, a suitable alcohol permeation rate and suitable alcohol selectivity are provided.

Presumably, the structure of the ultrafiltration membrane 15 (UF membrane) also has an influence on increasing the alcohol permeation rate and alcohol selectivity of the silica membrane 18. The silica membrane 18 is preferably structured to infiltrate into the Ultrafiltration membrane 15. Infiltration of the silica membrane 18 into the ultrafiltration membrane 15 can firmly secure the silica membrane 18 to the ultrafiltration membrane 15, thus suppressing delamination during firing and other defects. However, too much infiltration of the silica membrane 18 into the ultrafiltration membrane 15 may cause the filtration membrane to be clogged with the silica membrane, resulting in high permeation resistance of the membrane and increased resistance in liquid separation. Furthermore, to burn off an optimal amount of the aryl group in the silica membrane 18 inside the filtration membrane, it is necessary to perform firing at a high temperature. Firing at a high temperature may increase the risk of causing cracks. Presumably, for example, when the ultrafiltration membrane 15 has a water permeability in the range of 0.5 m/day to 6.0 m/day, the penetration of a raw material (silica sol) into the ultrafiltration membrane 15 during the formation of the silica membrane 18 is reduced, which enables the silica membrane 18 to be uniformly and thinly formed, on the surface of the ultrafiltration membrane 15. To burn off an optimal amount of the aryl group of the silica membrane 18, the silica membrane 18 may be fired at a high temperature (e.g., 550° C. or higher). However, a high firing temperature may cause cracks, for example, in the silica membrane 18 during firing. Cracks in the silica membrane 18 may significantly reduce separation performance. Here, since the ultrafiltration membrane 15 has a suitable structure, the silica membrane 18 containing an aryl group can be thinly and uniformly formed on the ultrafiltration membrane 15 so as to be in sufficient contact with a firing atmosphere during firing, and the aryl group can be burned off to an optimal amount if not fired at a high temperature.

It should be understood that the present invention is not limited to the embodiments described above and can be practiced in various aspects without departing from the technical idea of the present invention.

EXAMPLES

Hereinafter, examples in which silica membrane filters are produced in practice will be described as experimental examples. Experimental Examples 1 to 11 and 15 to 17 correspond to Examples of the present invention, and Experimental Examples 12 to 14 and 18 correspond to Comparative Examples.

[Production of Silica Membrane Filter]

A porous alumina cylindrical member (monolithic supporting member) having a diameter of 30 mm and a length of 160 mm and having 55 straight-through-holes (through-holes) with a diameter of 2.5 mm along the longitudinal direction was prepared by extrusion molding and firing. Next, a microfiltration membrane made of alumina and titania was formed in the through-holes and fired to obtain a support. Both ends of the monolithic substrate on which the microfiltration membrane was formed were sealed with molten glass (seal portions). Next, a titania ultrafiltration membrane (UF membrane) was formed in the through-holes. Titanium propoxide was hydrolyzed in the presence of nitric acid to prepare a titania sol solution. The sol particle size was measured by dynamic light scattering to be 100 nm. The titania sol solution was diluted with water, and PVA, an organic binder, was added as appropriate to obtain a: membrane-forming sol. The membrane-forming sol was distributed in the substrate cells so as to come into contact with the substrate cells to thereby form a membrane in the cells. After drying was performed, firing was performed at 400° C. to 500° C. This membrane-forming cycle involving distribution, drying, and firing was performed two to six times to obtain a porous substrate including the support and the ultrafiltration membrane formed thereon. After the last firing, the water permeability of the porous substrate (the support and the ultrafiltration membrane) was measured. The water permeability of the porous substrate was adjusted by controlling the amount of deposition (thickness) of the ultrafiltration membrane by the choice of the titania sol concentration and the number of membrane-forming cycles and controlling the pore size by the choice of the firing temperature and the amount of PVA.

A silica membrane was prepared using p-tolyltrimethoxysilane or phenyltrimethoxysilane as a silicon alkoxide having an aryl group. Ethanol and p-tolyltrimethoxysilane were mixed and stirred at 4° C. to prepare a mixed solution. Next, an aqueous nitric acid solution, was added portionwise to the mixed solution to cause hydrolysis. The aqueous nitric acid solution, was added until the pH of the mixed solution reached 0.3, followed by stirring at 4° C. for 1 hour. The mixed solution was then stirred at 50° C. for 3 hours to obtain a reaction solution. The pH was measured using a pH meter (Twin pH B-212 available from Horiba, Ltd). Subsequently, ethanol was added to dilute the entire reaction solution such that the reaction solution had a sol concentration in terms of silica of 2.0 mass % to thereby obtain a precursor sol of the silicon alkoxide containing a p-tolyl group.

The precursor sol was weighed out to 160 mL, and from one end of the above-described porous substrate with both its ends sealed with glass, the precursor sol was allowed to fall into the cells (through-holes). As a result, the precursor sol was applied to the inner wall surface of the cells. Next, the precursor sol was dried to form a dried membrane. The dried membrane was then held at a firing temperature of 370° C. to 550° C. for 1 hour to form a fired membrane. This fired-membrane-forming procedure from precursor sol application to heat treatment was repeated a predetermined number of times to produce a silica membrane filter including a silica membrane containing a p-tolyl group. The same procedure was performed using phenyltrimethoxysilane to produce a silica membrane filter containing a phenyl group.

Experimental Examples 1 to 18

Ultrafiltration membranes shown in Table 1 were prepared with the titania sol concentration, the firing temperature, and the number of membrane-forming cycles varied as appropriate. Table 1 also shows the water permeability of the ultrafiltration membranes prepared. Furthermore, p-tolyl silica membranes each having an aryl group were formed on the ultrafiltration membranes under conditions of the silica sol concentration, the number of membrane-forming cycles, and the firing temperature, shown in Table 2. Examples where ultrafiltration membranes and silica membranes were prepared under conditions shown in Tables 1 and 2 are called Experimental Examples 1 to 18. Table 2 summarizes evaluation results.

TABLE 1

| | PORE SIZE OF ULTRA-FILTRATION MEMBRANE nm | THICKNESS OF ULTRA-FILTRATION MEMBRANE μm | WATER PERMEABILITY OF ULTRA-FILTRATION MEMBRANE m/day |
|---|---|---|---|
| EXPERIMENTAL EXAMPLE1 | 4 | 1 | 2.1 |
| EXPERIMENTAL EXAMPLE2 | 5 | 0.2 | 5.1 |
| EXPERIMENTAL EXAMPLE3 | 2 | 0.5 | 2.9 |
| EXPERIMENTAL EXAMPLE4 | 8 | 1.5 | 2.8 |
| EXPERIMENTAL EXAMPLE5 | 20 | 5 | 4.1 |
| EXPERIMENTAL EXAMPLE6 | 25 | 5 | 5.3 |
| EXPERIMENTAL EXAMPLE7 | 4 | 2 | 1.5 |
| EXPERIMENTAL EXAMPLE8 | 6 | 2.5 | 2.0 |
| EXPERIMENTAL EXAMPLE9 | 4 | 1 | 2.1 |
| EXPERIMENTAL EXAMPLE10 | 4 | 1 | 2.1 |
| EXPERIMENTAL EXAMPLE11 | 4 | 1 | 2.1 |
| EXPERIMENTAL EXAMPLE12 | 4 | 1 | 2.0 |
| EXPERIMENTAL EXAMPLE13 | 8 | 0.3 | 4.2 |
| EXPERIMENTAL EXAMPLE14 | 12 | 0.3 | 6.8 |
| EXPERIMENTAL EXAMPLE15 | 4 | 1 | 2.1 |
| EXPERIMENTAL EXAMPLE16 | 4 | 1 | 2.1 |
| EXPERIMENTAL EXAMPLE17 | 4 | 1 | 2.1 |
| EXPERIMENTAL EXAMPLE18 | 9 | 0.3 | 5.0 |

(Pore Size of Ultrafiltration Membrane)

The average pore size of each ultrafiltration membrane was determined by the following method. First, n-hexane and nitrogen were flowed in parallel through the ultrafiltration membrane, and nitrogen permeation was measured with varying n-hexane partial pressure. Next, the measured values of n-hexane partial pressure were substituted into the Kelvin condensation equation, and from the pore size distribution obtained, the average pore size of the ultrafiltration membrane was determined (see Journal of Membrane Science 186 (2001) 257-265). When the partial pressure of hexane is 0, the nitrogen permeation is 1. The average pore size is defined as a pore size when the nitrogen permeation is reduced by half from 1, which is a value when the partial pressure of hexane is 0.

(Thickness of Ultrafiltration Membrane and Silica Membrane)

The thickness of each ultrafiltration membrane was measured. First, the silica membrane filter produced as described above was cut, and the cross section was observed under an electron microscope. In this electron microscopic image, 10 points were randomly selected and the vertical distance from the top to the bottom of the ultrafiltration membrane was measured, and the average was used as the thickness of the ultrafiltration membrane. Although the measurement of the thickness of the ultrafiltration membrane is performed at randomly selected 10 points, the electron microscope observation is performed in at least one field, more preferably in two or more fields. For example, the thickness measurement at two points may be performed in five fields. The thickness of each silica membrane was also measured by the same method.

(Water Permeability of Ultrafiltration Membrane (Porous Substrate))

The water permeability of each ultrafiltration membrane was measured, as described below. First, a seal portion was disposed on the outlet side of the ultrafiltration membrane (porous substrate) to seal one end of the cells, and distilled water was fed from the inlet side into the cells. The flow rate, pressure, and temperature of the feedwater were measured (see FIG. 2). The values obtained were converted to values under the conditions of 0.1 MPa pressure and 25° C., and the amount of water that had passed through the membrane per unit membrane area was defined as water permeability (m/day).

(Measurement of Atomic Ratio Si/C of Silica Membrane)

Figure 3:
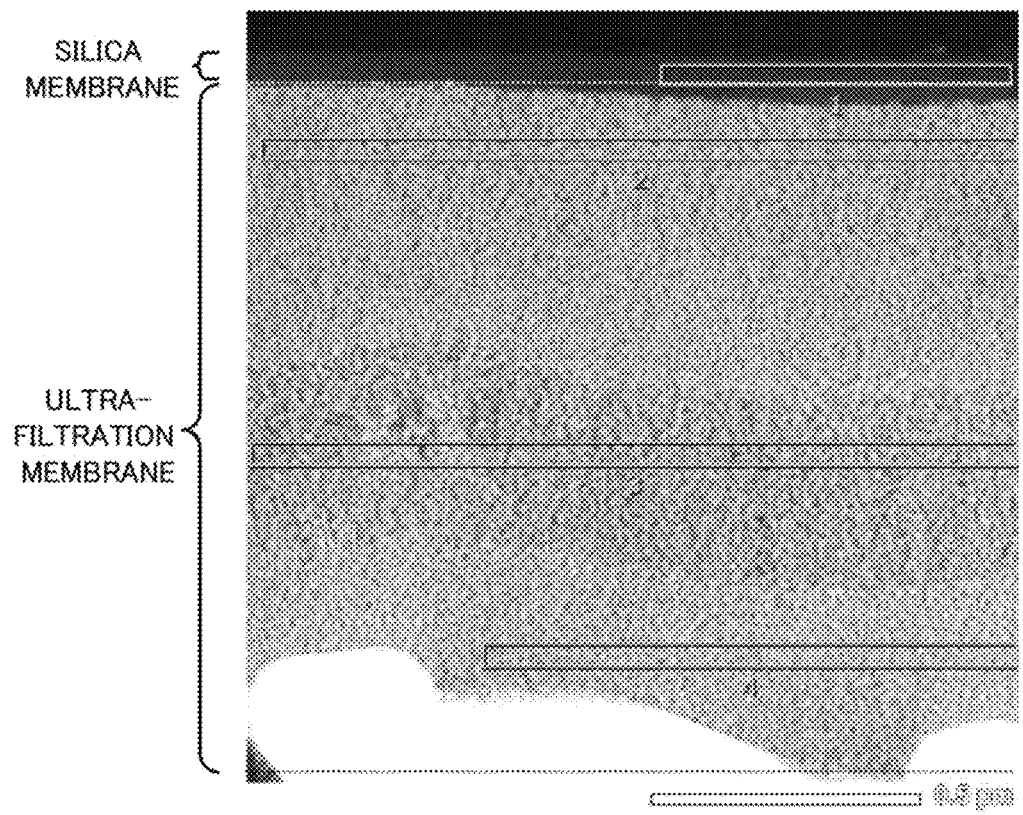
FIG. 3 shows an electron micrograph of a silica membrane filter of Experimental Example 1 and the results of EDX measurement.

Using a cross section of each of the silica membrane filters obtained, elemental analysis of a silica membrane was performed using energy-dispersive X-ray spectrometry (EDX). Ten points were randomly selected from a region of the silica membrane, and EDX elemental analysis was performed. Atomic ratios Si/C were determined from the results of the elemental analysis at the measured points and averaged to determine the Si/C value of the silica membrane. FIG. 3 shows an electron micrograph of a silica membrane filter of Experimental Example 1 and the results of EDX measurement. To avoid local measurement, the range of a field of EDX analysis in one measurement was set to be at least about 0.2 μm or more in the direction orthogonal to the thickness direction and about X μm or more in the thickness direction. X μm was defined as a silica membrane thickness (μm) in the field×about 0.5 or more.

(Fourier Transform infrared Absorption Spectrometry (FT-IR))

Figure 4:
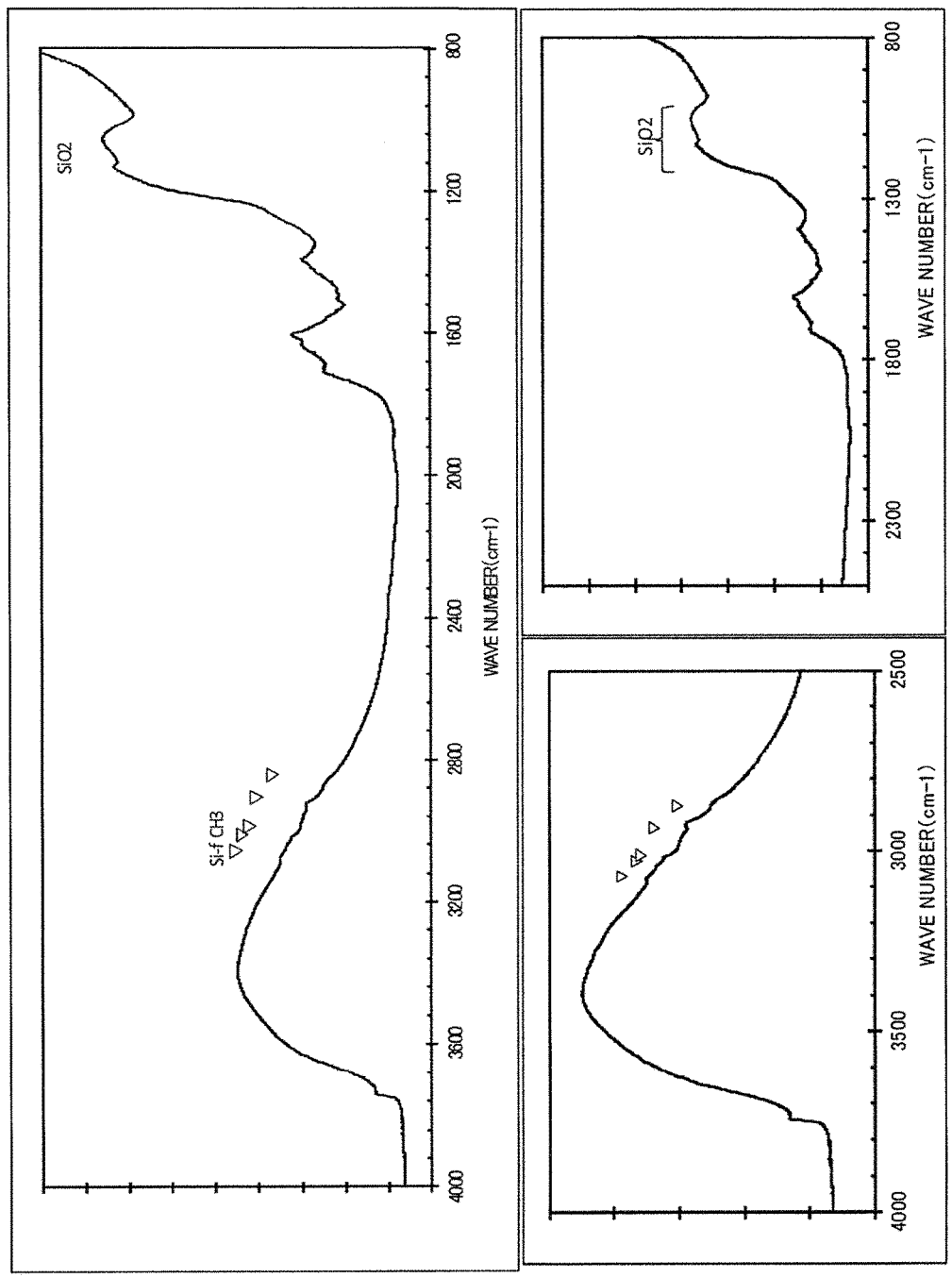
FIG. 4 shows the results of FT-IR measurement of the silica membrane of Experimental Example 1.

The surface of each silica membrane was scraped with a spatula to collect membrane powder. The sample was measured by diffuse reflectance spectroscopy using a Bio-Rad Diglab FTS-55A measuring instrument. The measurement was conducted with the membrane powder placed in a measuring cup. The diffuse reflectance spectrum obtained by the measurement was corrected using the Kubelka-Munk function. The silica intensity was defined as a peak intensity X at or near 1050 $cm^{-1}$, which is an absorption attributed to $SiO_2$, and the absorption intensity based on a p-tolyl group as a peak intensity Y at or near 3073 $cm^{-1}$, which is an absorption attributed to Si-Ph-$CH_3$ (Ph represents a benzene ring). The measurement was performed on 10 membrane powder samples, and the average of X/Y values obtained was used. FIG. 4 shows the results of FT-IR measurement of the silica membrane of Experimental Example 1. The peak intensities were obtained by subtracting baselines. For example, when a small peak was present on a large broad peak, the peak intensity of the small peak was determined by subtracting the broad peak as a baseline.

The amount of membrane deposition after firing was measured. The amount of membrane deposition was defined as a value obtained by subtracting the mass of a substrate and an ultrafiltration membrane formed thereon, before a silica raw material was fed, from the mass of a silica membrane filter, after the silica raw material was fed and a fired silica membrane was formed. The amount of membrane deposition (g/$m^2$) per unit membrane area was determined by dividing the total membrane mass by the total area of the silica membrane. The total area of the silica membrane was defined as an internal surface area of cells.

(Pervaporation Test 1)

A liquid mixture of ethanol and isooctane was prepared in a mass ratio (ethanol:isooctane) of 10:90. The liquid mixture at a temperature of 60° C. was distributed into cells of a silica membrane filter. The silica membrane filter was depressurized from the side surface of the filter at a degree of vacuum of 6 kPa, and permeated vapors flowing out from the side surface of the silica membrane filter were collected in a trap cooled with liquid nitrogen. A total permeation flux was calculated from the mass of a liquefied product of the collected permeated vapors. The liquefied product of the permeated vapors was analyzed by gas chromatography to determine the composition of the permeated vapors.

(Pervaporation Test 2)

A liquid mixture of ethanol, n-octane, and o-xylene was prepared in a mass ratio (ethanol:n-octane:o-xylene) of 10:45:45. The liquid mixture at a temperature of 70° C. was distributed into cells of a silica membrane filter. The silica membrane filter was depressurized from the side surface of the filter at a degree of vacuum of 6 kPa, and permeated vapors flowing out from, the side surface of the silica membrane filter were collected in a trap cooled with liquid nitrogen. A total permeation flux was calculated from the mass of a liquefied product of the collected permeated vapors. The liquefied product of the permeated vapors was analyzed by gas chromatography to determine the composition of the permeated vapors.

(Results and Discussion)

Table 2 shows that when the Si/C is in the range of 0.2 to 15, as in Experimental Examples 1 to 11 and 15 to 17, the ethanol permeation rate is high and the ethanol concentration (selectivity) is also high. Specifically, Tables 1 and 2 show the following. In Experimental Example 1, presumably, the better pore size and thickness of an ultrafiltration membrane reduced the water permeability, which reduced the amount of silica membrane deposition and allowed the amount of residual p-tolyl group to be controlled to be better, and as a result, a high ethanol permeation rate was exhibited. In Experimental Example 2, the small thickness of an ultrafiltration membrane increased the water permeability, which increased the amount of silica membrane deposition so that the amount of residual p-tolyl group increased, resulting in a relatively low ethanol permeation rate. In Experimental Example 3, due to the small pore size of an ultrafiltration membrane, the water permeability was relatively low and the amount of silica membrane deposition was small, but silica was not able to infiltrate into the pores of the ultrafiltration membrane and a thick silica surface layer was formed, resulting in a slightly low ethanol permeation rate. In Experimental Example 4, the high silica sol concentration increased the amount of membrane deposition and the amount of residual p-tolyl group, resulting in a slightly low ethanol permeation rate. In Experimental Example 5, due to the large pore size of an ultrafiltration membrane, the water permeability was not reduced to the desired level although the ultrafiltration membrane was thick, and the amount of silica membrane deposition and the amount of residual p-tolyl group increased, resulting in a slightly low ethanol permeation rate. In Experimental Example 6, due to the even larger pore size of an ultrafiltration membrane, the water permeability was not reduced to the desired level although the ultrafiltration membrane was thick, and the amount of silica membrane deposition and the amount of residual p-tolyl group increased, resulting in a low ethanol permeation rate. In Experimental Example 7, due to the low water permeability of an ultrafiltration membrane, the amount of silica membrane deposition and the amount of residual p-tolyl group were so small that an improved ethanol permeation rate was achieved, but the small amount of residual p-tolyl group led to insufficient interaction with ethanol, resulting in a slightly low permeated ethanol concentration (low ethanol selectivity). In Experimental Examples 8 and 9, due to the high firing temperature, the amount of silica membrane deposition and the amount of residual p-tolyl group were small, and as a result, the ethanol permeation rate was improved but the permeated ethanol concentration was slightly low. In Experimental Example 10, due to the large silica membrane thickness, the ethanol permeation rate was slightly low but the ethanol selectivity was improved. In Experimental Example 11, the aryl group was a phenyl group, but the same results as in the case of a p-tolyl group were obtained. In Experimental Example 12, due to the high firing temperature, the amount of residual p-tolyl group was small, resulting in a low permeated ethanol concentration. In Experimental Example 13, due to the low firing temperature, the amount of residual p-tolyl group was large, resulting in a low ethanol permeation rate. In Experimental Example 14, the water permeability was not reduced to the desired level by controlling the pore size and thickness of an ultrafiltration membrane, and thus the amount of silica membrane deposition and the amount of residual p-tolyl group were large, resulting in a low ethanol permeation rate. In Experimental Examples 15 and 17, although the silica membrane had a phenyl group and a relatively small thickness, the ethanol permeation rate and the permeated ethanol concentration were good. In Experimental Example 18, due to the high firing temperature, the Si/C was high, resulting in low ethanol selectivity. In Experimental Example 16, although the firing temperature was low, the silica membrane-thickness was relatively suitable, and a relatively high ethanol permeation rate and a relatively high permeated ethanol concentration were provided.

TABLE 2

| | ARYL GROUP | SILICA SOL CONCENTRATION mass % | | NUMBER OF MEMBRANE-FORMING CYCLES | FIRING TEMPERATURE ° C. | AMOUNT OF MEMBRANE DEPOSITION AFTER FIRING g/m$^2$ | THICKNESS OF SILICA MEMBRANE nm | Si/C | X/Y[1] | ETHANOL PERMIATION RATE kg/m$^2$/hr | PERMEATED ETHANOL CONCENTRATION mass % |
|---|---|---|---|---|---|---|---|---|---|---|---|
| | | 1st | 2nd | | | | | | | | |
| EXPERIMENTAL EXAMPLE 1 | P-TOLYL | 2.0 | 0.7 | 2 | 400 | 1.5 | 100 | 1.4 | 35.2 | 4.0 | 92 |
| EXPERIMENTAL EXAMPLE 2 | P-TOLYL | 2.0 | 0.7 | 2 | 400 | 3.8 | 50 | 0.47 | 10.3 | 2.5 | 97 |
| EXPERIMENTAL EXAMPLE 3 | P-TOLYL | 2.0 | 0.7 | 2 | 400 | 1.3 | 300 | 0.95 | 18.5 | 3.4 | 96 |
| EXPERIMENTAL EXAMPLE 4 | P-TOLYL | 2.0 | 2.0 | 2 | 400 | 2.5 | 200 | 0.52 | 12.2 | 3.0 | 98 |
| EXPERIMENTAL EXAMPLE 5 | P-TOLYL | 2.0 | 2.0 | 2 | 400 | 3.6 | 100 | 0.33 | 8.8 | 2.5 | 96 |
| EXPERIMENTAL EXAMPLE 6 | P-TOLYL | 2.0 | 2.0 | 2 | 400 | 5.2 | 50 | 0.24 | 7.1 | 2.1 | 98 |
| EXPERIMENTAL EXAMPLE 7 | P-TOLYL | 2.0 | 0.7 | 2 | 400 | 0.7 | 50 | 2.2 | 58.3 | 5.1 | 75 |
| EXPERIMENTAL EXAMPLE 8 | P-TOLYL | 2.0 | 2.0 | 2 | 450 | 1.7 | | | | | |
| EXPERIMENTAL EXAMPLE 9 | P-TOLYL | 2.0 | 0.7 | 2 | 450 | 0.9 | | | | | |
| EXPERIMENTAL EXAMPLE 10 | P-TOLYL | 2.0 | 2.0 | 3 | 400 | 5.5 | | | | | |
| EXPERIMENTAL EXAMPLE 11 | PHENYL | 2.0 | 2.0 | 2 | 400 | 2.2 | | | | | |
| EXPERIMENTAL EXAMPLE 12[2] | P-TOLYL | 2.0 | 2.0 | 2 | 550 | 2.1 | | | | | |
| EXPERIMENTAL EXAMPLE 13 | P-TOLYL | 2.0 | 2.0 | 2 | 370 | 3.8 | | | | | |
| EXPERIMENTAL EXAMPLE 14 | P-TOLYL | 2.0 | 2.0 | 2 | 400 | 5.4 | | | | | |
| EXPERIMENTAL EXAMPLE 15 | PHENYL | 2.0 | 2.0 | 2 | 370 | 3.5 | | | | | |
| EXPERIMENTAL EXAMPLE 16 | P-TOLYL | 2.0 | 0.7 | 2 | 370 | 1.6 | | | | | |
| EXPERIMENTAL EXAMPLE 17 | PHENYL | 2.0 | 2.0 | 2 | 425 | 3.0 | | | | | |
| EXPERIMENTAL EXAMPLE 18[2] | PHENYL | 2.0 | 2.0 | 3 | 550 | 4.8 | | | | | |

TABLE 2-continued

|  | | | | | |
|---|---|---|---|---|---|
| EXPERIMENTAL EXAMPLE 8 | 60 | 7.9 | 155 | 5.5 | 63 |
| EXPERIMENTAL EXAMPLE 9 | 40 | 13 | 180 | 6.0 | 49 |
| EXPERIMENTAL EXAMPLE 10 | 600 | 0.25 | 8.0 | 2.2 | 99 |
| EXPERIMENTAL EXAMPLE 11 | 40 | 0.48 | 21.8 | 3.3 | 75 |
| EXPERIMENTAL EXAMPLE 12[2] | 10 | 20 | — | 5.9 | 37 |
| EXPERIMENTAL EXAMPLE 13 | 300 | 0.18 | 3.8 | 1.5 | 95 |
| EXPERIMENTAL EXAMPLE 14 | 150 | 0.18 | 4.1 | 1.3 | 98 |
| EXPERIMENTAL EXAMPLE 15 | 60 | 0.25 | 9.8 | 2.3 | 85 |
| EXPERIMENTAL EXAMPLE 16 | 130 | 0.55 | 14.1 | 3.0 | 95 |
| EXPERIMENTAL EXAMPLE 17 | 50 | 1.3 | 32.5 | 3.8 | 70 |
| EXPERIMENTAL EXAMPLE 18[2] | 100 | 25 | — | 5.3 | 39 |

[1] X: Absorption intensity of a Si—O—Si bond by FT-IR. Y: Absorption intensity of a Si—Ph—CH3 bond by FT-IR
[2] X/Y is less than lower limit of measurement The pervaporation test 2 revealed that o-xylene permeated through the membrane preferentially after ethanol, as shown in Table 3. In general, n-octane, which is a linear hydrocarbon, has a smaller molecular size than o-xylene, which is an aromatic compound, and more readily permeates through a membrane. However, the silica membranes of Examples of the present invention had a tendency to be more permeable to o-xylene, which has a larger molecular size. This, is presumably due to the following reason. For example, pores formed in the silica membrane as a result of burning off of the aryl group have the same planar shape as that of the aryl group, and this pore shape is suitable for the permeation of o-xylene, which is an aromatic component that also has a planar molecular shape. Thus, presumably, the silica membrane filters of Examples of the present invention were permeable more preferentially to o-xylene than to n-octane, which does not have a planar structure.

carbon and showed that, as shown in Table 2, when a silica membrane has an atomic ratio Si/C in the range of 0.2 to 15, a high alcohol permeation rate and high alcohol permeation concentration (selectivity), which are more advantageous membrane properties, are provided. This is presumably due to the following reason. For example, the silica membrane containing an aryl group (a p-tolyl group or a phenyl group) can have, due to the presence of the aryl group in a silica network, larger pores than conventional silica membranes when the aryl group is burned off; whereas when the aryl group remains in the silica membrane, the aryl group can interact, during liquid separation, with permeable components to promote permeation. Presumably, when the silica membrane has an atomic ratio Si/C in the range of 0.2 to 1.5, pores suitably permeable to alcohol are sufficiently present and the aryl group (carbon: C) suitably remains, and as a result, a suitable alcohol permeation rate and suitable alco-

TABLE 3

|  | ETHANOL PERMIATION RATE kg/m²/hr | N-OCTANE PERMIATION RATE kg/m²/hr | O-XYLENE PERMIATION RATE kg/m²/hr | PERMEATED ETHANOL CONCENTRATION mass % | RATIO OF O-XYLENE/ N-OCTANE |
|---|---|---|---|---|---|
| EXPERIMENTAL EXAMPLE1 | 9.6 | 0.6 | 1.9 | 79 | 3.2 |
| EXPERIMENTAL EXAMPLE2 | 5.1 | 0.3 | 0.7 | 84 | 2.3 |
| EXPERIMENTAL EXAMPLE4 | 6.5 | 0.2 | 0.5 | 90 | 2.5 |
| EXPERIMENTAL EXAMPLE9 | 10.8 | 6.2 | 7 | 45 | 1.1 |
| EXPERIMENTAL EXAMPLE12 | 11.5 | 7.5 | 6.7 | 45 | 0.9 |
| EXPERIMENTAL EXAMPLE15 | 4.5 | 0.6 | 1.2 | 71 | 2.0 |
| EXPERIMENTAL EXAMPLE16 | 6.9 | 0.4 | 1.1 | 82 | 2.8 |
| EXPERIMENTAL EXAMPLE17 | 8.6 | 1.7 | 3.2 | 64 | 1.9 |
| EXPERIMENTAL EXAMPLE18 | 10.5 | 7.1 | 7.0 | 43 | 1.0 |

Experimental Examples 1 to 11 and 15 to 17 revealed that there is the above-described tendency with respect to the separation of organic liquid mixtures of alcohol and hydrohol selectivity are provided. There was a tendency that the alcohol selectivity increased as the Si/C neared the lower limit and the permeation rate increased as the Si/C neared the upper limit. Thus, it was found that an appropriate atomic ratio Si/C may be selected within the above range depending on whether separation speed or separation selectivity is given higher priority.

It was also found that the silica membrane, when having a thickness in the range of 30 nm to 300 nm, exhibits a high alcohol permeation rate and high alcohol selectivity, which are more advantageous membrane properties. Furthermore, it was found that when the amount of silica membrane deposition is in the range of 0.3 g/m$^2$ to 5.2 g/m$^2$, a high alcohol permeation rate and high alcohol selectivity, which are more advantageous membrane properties, are provided. Presumably, when the thickness of the silica membrane and the amount of deposition after firing are within the above ranges, for example, the surface of the ultrafiltration membrane can be sufficiently covered, with the silica membrane, and the aryl group is suitably burned off and remains. Furthermore, it was also found that the silica membrane, when, having an X/Y, a ratio of an absorption intensity X of a Si—O—Si bond to an absorption intensity Y of a Si-Ph-CH$_3$ bond determined by FT-IR, in the range of 5.0 to 200, exhibits a high alcohol permeation rate and high alcohol selectivity, which are more advantageous membrane properties. This is presumably because the p-tolyl group is suitably burned off and remains when the X/Y is within the above range.

Furthermore, presumably, the structure of the ultrafiltration membrane also has an influence on increasing the alcohol permeation rate and alcohol selectivity of the silica membrane. For example, as shown in Tables 1 and 2, presumably, when the ultrafiltration membrane has a water permeability in the range of 0.5 m/day to 6.0 m/day, the penetration of a raw material (silica sol) during the formation of the silica membrane is reduced, which enables the silica membrane to be uniformly and thinly formed on the surface of the ultrafiltration membrane. Furthermore, presumably, when the ultrafiltration membrane has an average pore size in the range of 2 to 25 nm and a thickness in the range of 0.2 μm to 5 μm, the penetration of a raw material (silica sol) during the formation of the silica membrane is reduced, which enables the silica membrane to be uniformly and thinly formed on the surface of the ultrafiltration membrane. To burn off an optimal amount of the aryl group (the p-tolyl group or the phenyl group) of the silica membrane, the silica membrane may be fired at a high temperature (e.g., 550° C. or higher). However, a high firing temperature may cause cracks during firing. Cracks in the silica membrane may significantly reduce separation performance. Here, presumably, since the ultrafiltration membrane has the above-described suitable structure, the silica membrane-containing an aryl group can be thinly and uniformly formed on the ultrafiltration membrane so as to be in sufficient contact with a firing atmosphere during firing, and the aryl group can be burned off to an optimal amount if not fired at a high temperature.

As described above, it was found that when pores suitably permeable to alcohol are sufficiently present in a silica membrane and an aryl group (carbon: C) suitably remains in the silica membrane, a more suitable alcohol permeation rate and more suitable alcohol selectivity can be provided.

It should be understood that the present invention is not limited to the examples described above and can be practiced in various aspects without departing from the technical idea of the present invention.

The present application claims priority from Japanese Patent Application No. 2015-055919, file on Mar. 19, 2015, the entire contents of which are incorporated herein by reference.

What is claimed is:

1. A silica membrane having an aryl group and an atomic ratio Si/C, as determined by elemental analysis using energy-dispersive X-ray spectrometry (EDX), in a range of 0.2 to 15,
    wherein the silica membrane has a thickness in a range of 30 nm to 300 nm, and
    wherein the silica membrane has an X/Y, which is a ratio of an absorption intensity X of a Si—O—Si bond to an absorption intensity Y based on the aryl group in a Fourier transform infrared absorption spectrum (FT-IR), in a range of 5.0 to 200, wherein the silica membrane is formed on a porous substrate having a water permeability in a range of 0.5 m/day to 6.0 m/day.

2. The silica membrane according to claim 1, wherein the Si/C is 0.5 or more.

3. The silica membrane according to claim 1, wherein the Si/C is 8.0 or less.

4. The silica membrane according to claim 1, wherein the silica membrane is formed on a porous substrate in an amount in a range of 0.3 g/m$^2$ to 5.2 g/m$^2$.

5. The silica membrane according to claim 1, wherein the silica membrane is formed on an ultrafiltration membrane of the porous substrate, and
    the ultrafiltration membrane has an average pore size in a range of 2 nm to 25 nm.

6. The silica membrane according to claim 1, wherein the silica membrane is formed on an ultrafiltration membrane of the porous substrate, and
    the ultrafiltration membrane has a thickness in a range of 0.2 μm to 5 μm.

7. The silica membrane according to claim 1, wherein the silica membrane is formed on an ultrafiltration membrane of the porous substrate, and
    the ultrafiltration membrane contains Ti as a principal component.

8. The silica membrane according to claim 1, wherein the aryl group is at least one selected from a p-tolyl group and a phenyl group.

9. A separation membrane filter comprising the silica membrane according to claim 1.

* * * * *